A. L. MILENTZ.
GLASS CUTTING MACHINE.
APPLICATION FILED MAY 13, 1912.
1,152,653.
Patented Sept. 7, 1915.
3 SHEETS—SHEET 1.
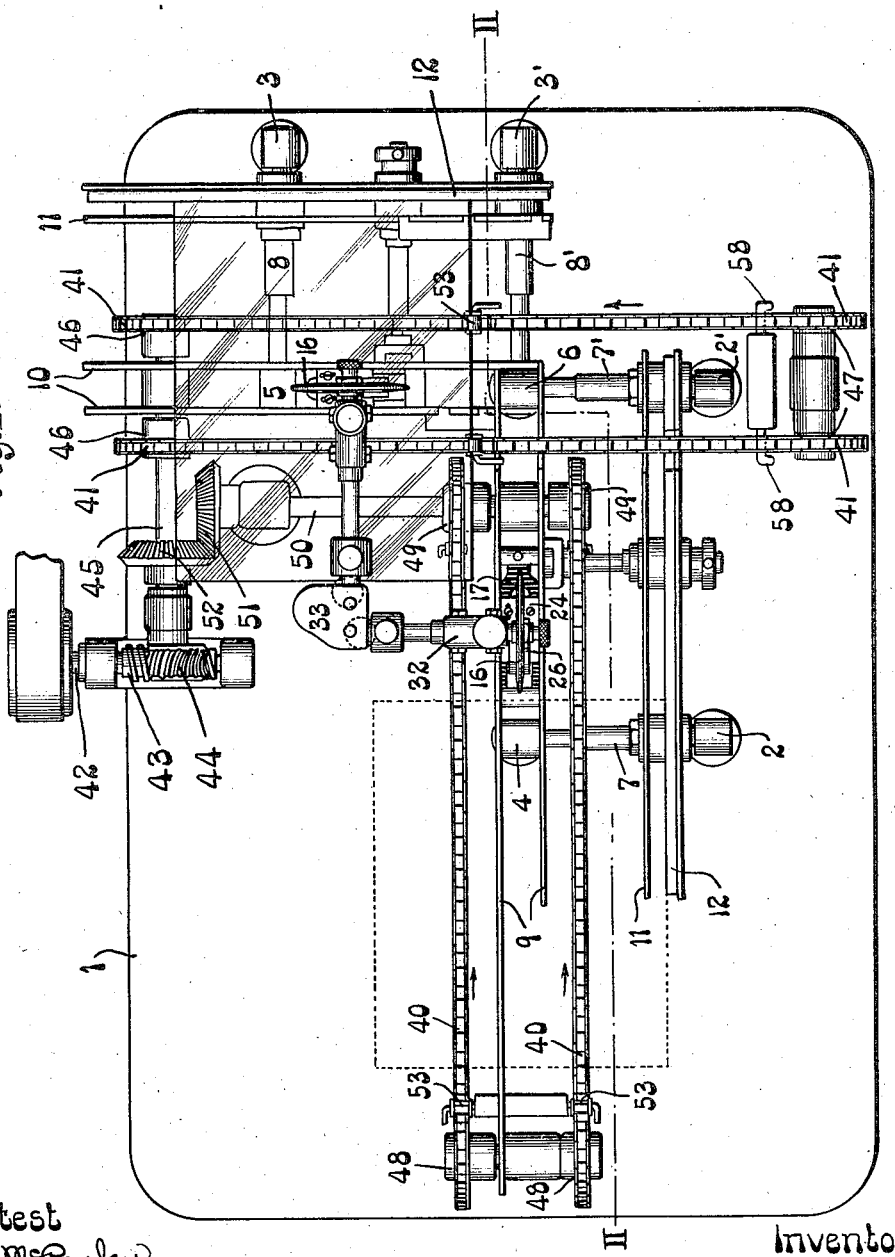
Attest
Inventor
A.L. Milentz
by Knight & Cook Att'ys.

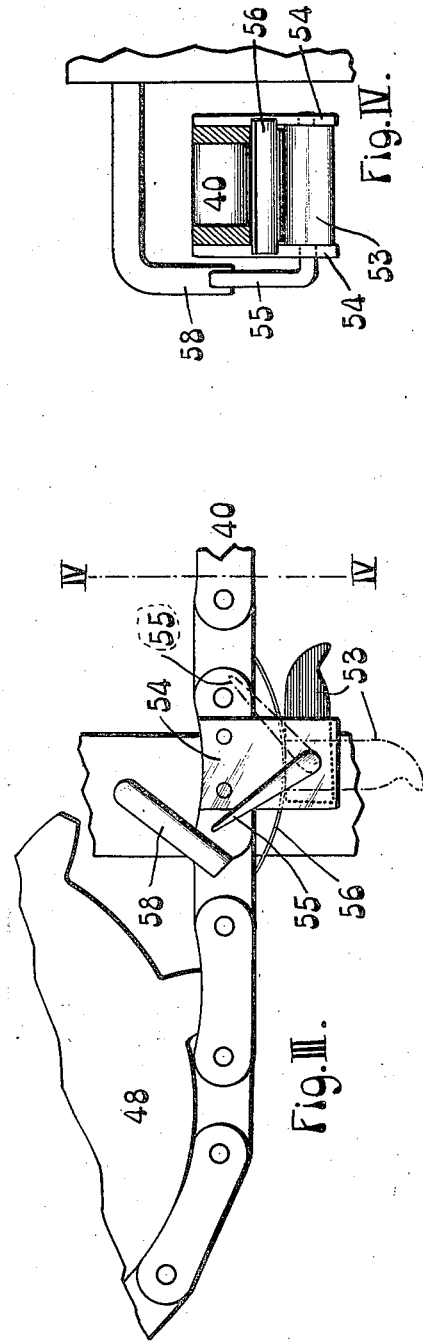
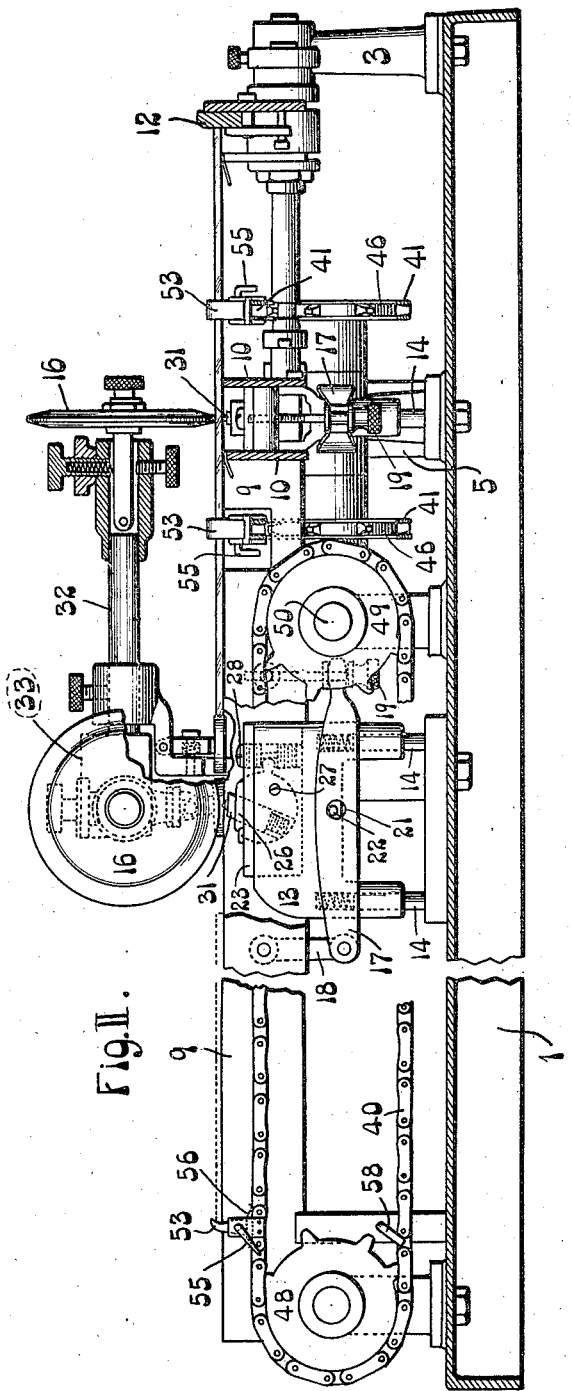

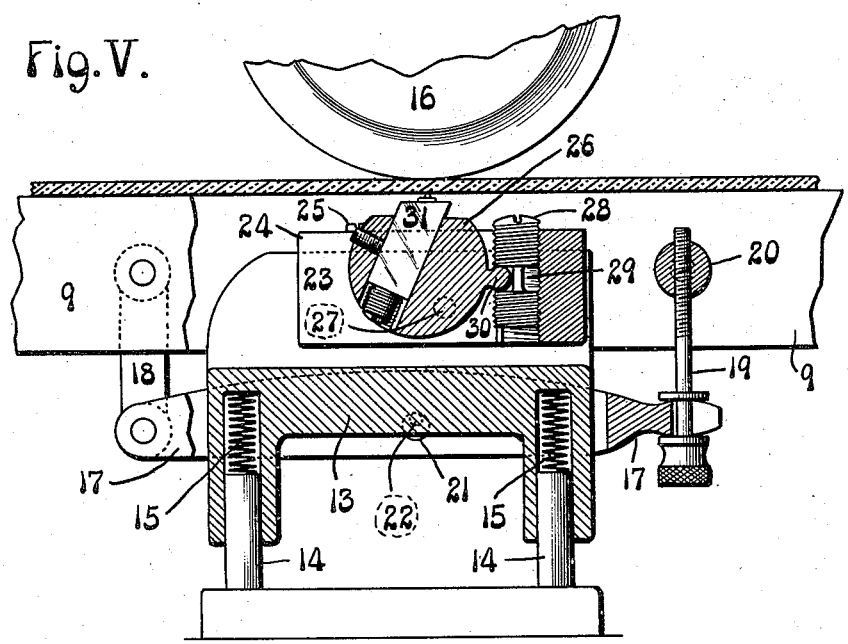
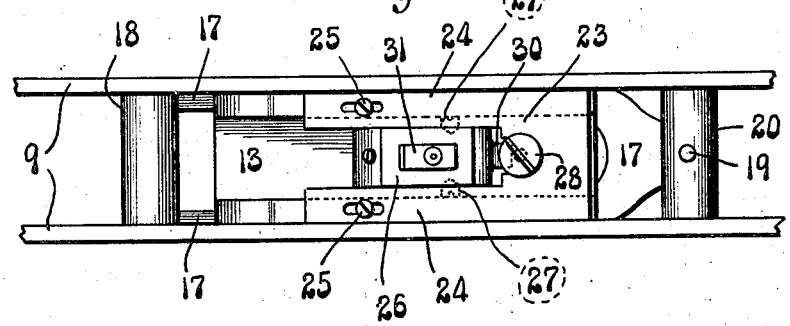

UNITED STATES PATENT OFFICE.

ARNOLD L. MILENTZ, OF ST. LOUIS, MISSOURI.

GLASS-CUTTING MACHINE.

1,152,653.   Specification of Letters Patent.   Patented Sept. 7, 1915.

Application filed May 13, 1912. Serial No. 696,935.

*To all whom it may concern:*

Be it known that I, ARNOLD L. MILENTZ, a citizen of the United States of America, residing in the county of St. Louis and State of Missouri, have invented certain new and useful Improvements in Glass-Cutting Machines, of which the following is a full, clear, and exact description, reference being had to the accompanying drawings, forming a part of this specification.

My invention relates to a machine for cutting sheets of glass into various sized plates, the machine being more particularly intended for use in cutting sheets of glass to be used as photographic dry plates.

The present invention is an improvement on the glass cutting machine shown in Patent No. 933,481, issued to me September 7, 1909.

In cutting sheets of glass by the use of the machine shown in the patent just referred to, the glass sheets are fed to the cutters by hand, and this method of feeding the sheets has been found to be quite objectionable on account of the time and labor involved, and for the further reason that in feeding photographic dry plates through the machine, the operator is liable to injure the plates with finger prints, or otherwise mar the sensitized coating on such plates.

Therefore, one of the objects of the present invention is to provide means for automatically feeding the glass plates in an angular path from one cutter to another so as to produce cuts at an angle to each other.

The invention also includes details of construction which will be hereinafter pointed out.

Figure I is a top or plan view of my improved glass-cutting machine. Fig. II is an enlarged vertical section, partly broken away, taken approximately on line II—II, Fig. I. Fig. III is an enlarged detail view showing a yieldable pusher, and the means for restoring said pusher to its operative position. Fig. IV is a section taken on the line IV—IV, Fig. III. Fig. V is an enlarged vertical section taken through the cutting device. Fig. VI is a top or plan view of the cutter and parts associated with it.

In the accompanying drawings: 1 designates the base of my machine at one side of which is a pair of outer posts 2 and 2'; and at another side, at right angles to the first mentioned side, is a pair of outer posts 3 and 3'.

4 is a post located opposite the post 2.

5 is a post located opposite the post 3 and 6 is an intermediate post located opposite to both of the posts 2' and 3'.

The posts 2 and 4 have mounted therein above the base a supporting rod 7 and the posts 2' and 6' have mounted therein a supporting rod 7' that is parallel with the rod 7. The posts 3 and 5, and 3' and 6 have mounted in them supporting rods 8 and 8' arranged parallel with each other and at a right angle to the supporting rods 7 and 7'.

9 designates supporting rails fixed to the posts 4 and 6, and 10 are supporting rails fixed to the posts 6 and 5 and extending transversely relative to the rails 9, or at a right angle relative to said rails. The rails 9 and 10 provide for the partial support of the sheets of glass to be cut in my machine when said sheets are moved first in one general course and then in the general course at a right angle to the first course. In order that the sheets of glass to be cut may be fully supported while passing through the machine I provide, in conjunction with each pair of supporting rails 9 and 10, adjustable supporting rails 11, and guiding members 12. These parts are supported by the supporting rods 7, 7' and 8 and 8', there being two sets of the parts, one of which is companionable with the supporting rails 9 while the other set is companionable with the supporting rails, 10.

The cutters of my machine and their supports, which are associated with the supporting rails 9 and 10, are similar in construction and a description of one of the cutting devices will apply to the other.

13 designates a yieldable cutter support arranged between the supporting rails and slidably fitted to posts 14 which extend upwardly from the base of the machine. Springs 15, above the posts 14, tend to force the cutter support upwardly toward a pressure roller 16. A stop yoke 17 embracing the cutter support 13 is connected at one of its ends to the rails 9 by means of a link 18, and its other end is adjustably connected to the rails through the medium of a screw 19, (Fig. V), passing through a threaded opening in a distance piece 20 arranged between the rails 9. The stop yoke 17 is provided with apertures 21 for the reception of stop pins 22 on the sides of the vertically movable cutter support 13. A bifurcated frame 23 is provided with flanges 24 which rest on the top face of the cutter support 13. This frame 23 is adjustably connected to the cutter support by means of screws 25 passing through slots in the flanges 24. A cutter holder 26 is pivoted at 27 to the frame 23. The cutter holder may be rocked on its pivot by turning an adjusting screw 28 threaded into the frame 23 and provided with an annular recess 29 for the reception of a projection 30 on the cutter holder. A cutter 31 is arranged in the cutter holder and may be secured thereto by suitable set screws. It should be noted that a very fine vertical adjustment of the cutter may be obtained by turning the adjusting screw 28, and as this screw is interlocked with the cutter holder 26, it positively locks the cutter in its adjusted position.

The pressure roller 16 above the cutter is attached to an arm 32, the latter being fixed to a post 33. The means for attaching the pressure roller 16 to the arm 32 is fully shown and described in the patent previously referred to, and forms no part of this invention.

In the practical use of my machine, the sheet of glass to be cut is first laid upon the supporting rails 9 and 11, and one edge of the sheet of glass is placed in contact with the guide bar 12, (see dotted lines in Fig. I). The sheet of glass is then moved by mechanism to be hereinafter described so that it passes beneath a pressure roller 16 and over the cutter beneath said wheel, with the result of causing said sheet of glass to be cut at its lower side by the yieldably supported cutter. The movement of the sheet of glass is continued until the sheet is cut or scored from one edge to the opposite edge thereof while it is traversing the cutter just mentioned. The sheet of glass then moves over the track rails 10 and abuts against the guide bar 12 at the right hand side of Fig. I, and is thereafter moved along the rails 10 to be cut at a right angle to the first mentioned cut, the last cutting operation taking place while the sheet of glass is passing over the cutter between the supporting rails 10.

It should be noted that as the sensitized film surface of the plate is uppermost, it is not injured in its travel through the machine, either by being brought into contact with the cutters or the supporting rails.

The means for pushing the sheet of glass along the supporting rails preferably comprises traveling chains 40 adjacent to the supporting rails 9 and similar chains 41 adjacent to the suporting rails 10. The chains are driven through the medium of a power shaft 42, (Fig. I), provided with a worm 43 meshing with a worm wheel 44 on a shaft 45. The chains 41 pass around drive sprocket wheels 46 fixed to the shaft 45, and also pass around idle wheels 47. The chains 40 pass around idle wheels 48 and drive wheels 49, the latter being fixed to a shaft 50. A bevel gear 51 fixed to the end of the shaft 50 is driven by a bevel gear 52 on the shaft 45. The chains 40 and 41 lie below the top faces of the supporting rails 9 and 10, and are provided with pusher fingers 53 adapted to engage the edges of the sheets of glass. Each pusher finger 53 is pivotally mounted between a pair of plates 54 and provided with a restoring arm 55, Figs. III and IV. A spring 56 arranged between the pusher finger and sprocket chain tends to hold the pusher in an inoperative position, shown in full lines Fig. III, or in its operative position shown by dotted lines. When the finger is performing its function of pushing the glass plates, it lies in the position seen in Fig. II, but if the plate strikes an obstruction, the finger will yield and pass under the glass plate. After a plate receives its initial cut by the first cutter, it is forced against the guide bar 12 at the right hand side of Fig. I, and the pusher fingers on the chains 40 will then yield, move to an inoperative position, and pass under the glass plate. Stationary cam fingers 58 are associated with the traveling chains 40 and 41 for the purpose of restoring the pusher fingers. Referring to Fig. III, it will be seen that the stationary cam finger 58 lies in the path of the restoring arm 55 on the pusher finger 53, and as the arm 55 passes under the stationary cam 58, the arm 55 and finger 53 will rock to the position shown by dotted lines.

I claim:—

1. In a glass cutting machine, a pair of cutters, one of which is arranged at an angle to the other, stationary means upon which a sheet of glass may be conducted to be cut first by one of said cutters and thereafter by the other cutter at an angle to the first cut, traveling pushers for moving the sheet of glass from one of said cutters to the other cutter, and means for operating said pushers.

2. In a glass cutting machine, a pair of cutters, one of which is arranged at an angle to the other, stationary means upon which a sheet of glass may be conducted to be cut first by one of said cutters and thereafter by the other cutter at an angle to the first cut, traveling pushers for moving the sheet of glass from one of said cutters to the other cutter, means for operating said pushers, and a yieldable device for holding said pushers engaged with the sheet of glass.

3. In a glass cutting machine, a pair of cutters, one of which is arranged at an angle to the other, means upon which a sheet of glass may be conducted to be cut first by one of said cutters and then by the other cutter at an angle to the first cut, traveling pushers for moving the sheet of glass in an angular path from one to the other of said cutters, means for operating said pushers, an abutment adapted to be engaged by the sheet of glass as it moves from one cutter to the other cutter, and a yielding device for holding one of said pushers engaged with the sheet of glass until the latter strikes said abutment.

4. In a glass cutting machine, a pair of cutters, one of which is arranged at an angle to the other, means upon which a sheet of glass may be conducted to be cut first by one of said cutters and then by the other cutter at an angle to the first cut, traveling pushers for moving the sheet of glass in an angular path from one to the other of said cutters, means for operating said pushers, an abutment adapted to be engaged by the sheet of glass as it moves from one cutter to the other cutter, a yielding device for holding one of said pushers engaged with the sheet of glass until the latter strikes said abutment, the said yielding device allowing the pusher to move to an inoperative position, and means for restoring said pusher to its operative position.

ARNOLD L. MILENTZ.

In the presence of—
A. J. McCauley,
E. B. Linn.